Feb. 17, 1970    L. J. BONTRAGER    3,495,866
COLLAPSIBLE TRAILER

Filed May 27, 1967    4 Sheets-Sheet 1

INVENTOR.
LLOYD J. BONTRAGER
BY
Eugene C. Knoblock
ATTORNEY

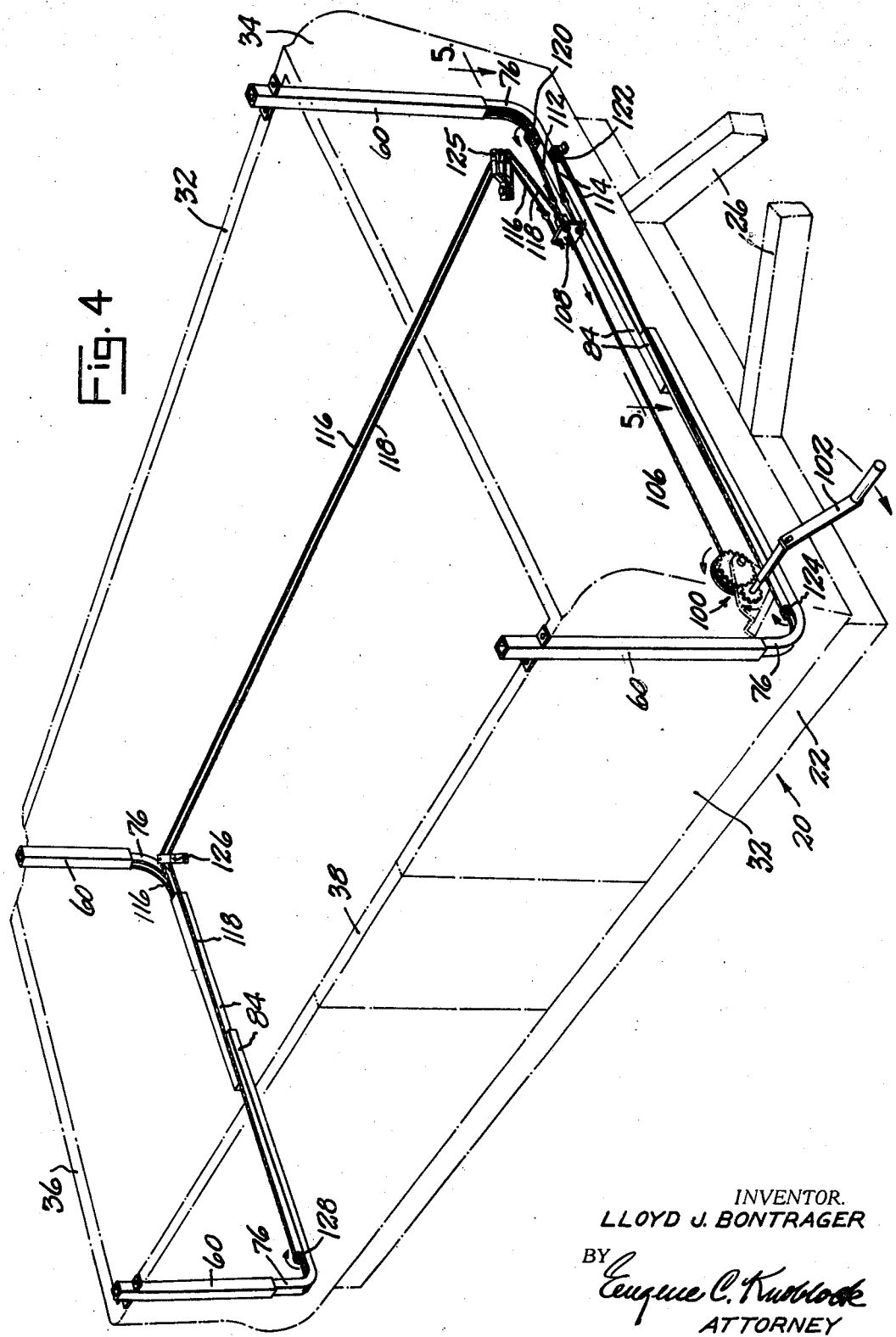

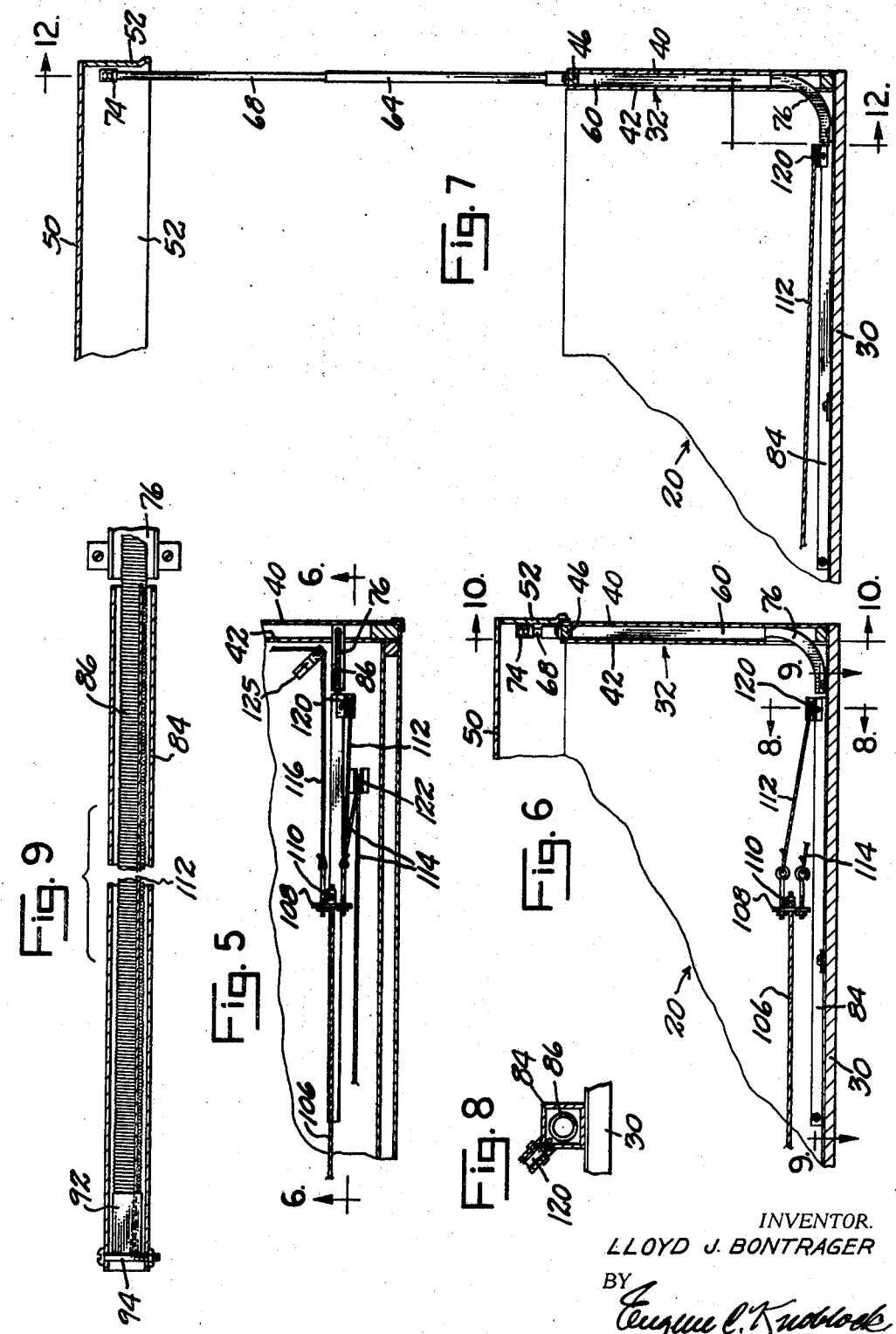

Feb. 17, 1970  L. J. BONTRAGER  3,495,866
COLLAPSIBLE TRAILER
Filed May 27, 1968  4 Sheets-Sheet 4
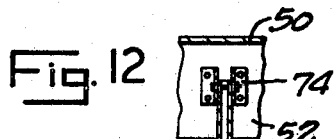
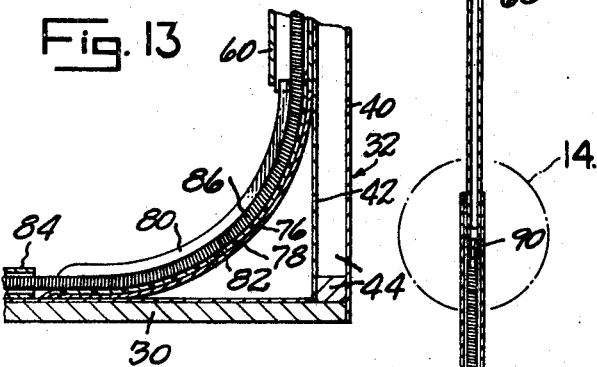
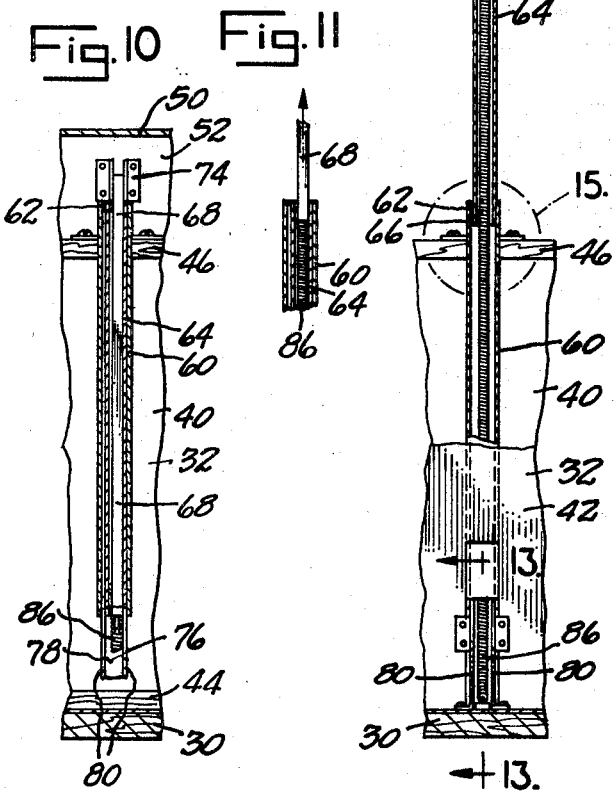
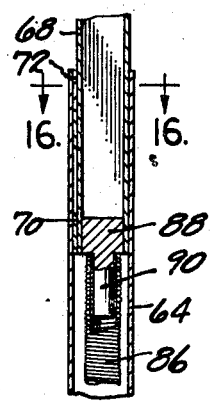
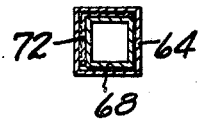
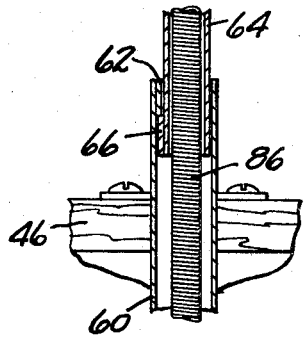
INVENTOR.
LLOYD J. BONTRAGER
BY
ATTORNEY United States Patent Office 3,495,866
Patented Feb. 17, 1970

3,495,866
COLLAPSIBLE TRAILER
Lloyd J. Bontrager, Middlebury, Ind.
(R.R. 1, Box 258, Goshen, Ind. 46526)
Filed May 27, 1968, Ser. No. 732,422
Int. Cl. B60p 3/34
U.S. Cl. 296—27                                        10 Claims

ABSTRACT OF THE DISCLOSURE

A collapsible trailer having a wheeled body and a top shiftable between collapsed and elevated positions on vertical telescoping posts carried by the body. Each post cooperates with a curved guide and a horizontal guide tube to receive an elongated flexible incompressible member shiftable endwise in said guide tube, curved guide and post to extend and retract the post. Post elevating means include parts adapted to propel endwise the lower ends of said incompressible members and each extending through and partly guided by a guide tube.

---

This invention relates to improvements in collapsible trailers of the type which provide living quarters when extended or erected. The invention relates to travel trailers of the type shown in my Patent 3,314,715, dated Apr. 18, 1967.

Collapsible travel trailers are characterized by a wheel mounted body, a rigid top which can be raised and lowered, and flexible or collapsible side walls between the top and the body. In collapsed condition the trailer has a low profile which facilitates towing thereof. The top must be elevated to prepare the trailer for use as living quarters. Various mechanisms and arrangements have been utilized in the past to elevate and lower the top and these have commonly been difficult to operate or have been characterized by complicated constructions and arrangements. In some prior units operating parts are exposed to dirt, slush and rusting incident to use, or multiple operating parts thereof may not be readily accessible. Other prior units have had characteristics which are objectionable for other reasons.

It is the primary object of this invention to provide a device of this character which is inexpensive, simple, and easy to manufacture and to operate.

A further object is to provide a device of this character wherein all operating parts may be located within the trailer body so as to be protected against road dirt, mud, slush and corrosive materials, such as road salt used in snowy and icy weather.

A further object is to provide a trailer construction having top elevating means including telescoping posts which can be installed between inner and outer side walls of a trailer body and which cooperate with associated mechanism in such a manner that the interior paneling of the body is interrupted only at a limited part thereof, thereby preserving strength of the body.

A further object is to provide a device of this character using vertical posts formed of interfitting telescoping tubes which are urged to extended position by longitudinal movement in each of a flexible pusher element which is advanced endwise therein from a horizontal guide tube which receives a part of the pusher element when the top is collapsed.

A further object is to provide a device of this character wherein telescoping tubes can be extended and collapsed simultaneously and equally by cable means which advance incompressible post elevating means and are guided partially by and extend through guide tubes normally receiving parts of said post elevating means.

Other objects will be apparent from the following specification.

In the drawings:

FIG. 4 is a perspective schematic view of the trailer body illustrating the construction and arrangement of the top elevating means.

FIG. 5 is a fragmentary transverse horizontal sectional view taken on line 5—5 of FIG. 4.

FIG. 6 is a fragmentary transverse vertical sectional view taken on line 6—6 of FIG. 5, with the top in lower position.

FIG. 7 is a view similar to FIG. 6 but illustrating the top and the elevating means in extended or erected position.

FIG. 8 is a fragmentary transverse detail sectional view taken on line 8—8 of FIG. 6.

FIG. 9 is a detail horizontal sectional view taken on line 9—9 of FIG. 6.

FIG. 10 is a detail vertical sectional view taken on line 10—10 of FIG. 6.

FIG. 11 is a fragmentary view illustrating an intermediate position of the top elevating means.

FIG. 12 is a vertical sectional view taken on line 12—12 of FIG. 7 and illustrating the device in extended position.

FIG. 13 is an enlarged vertical sectional view taken on line 13—13 of FIG. 12.

FIG. 14 is an enlarged fragmentary vertical sectional view of the portion of the extended top supporting means shown in the area 14 of FIG. 12.

FIG. 15 is an enlarged fragmentary detail sectional view of the portion of the top elevating means shown in the area 15 of FIG. 12.

FIG. 16 is a transverse detail sectional view taken on line 16—16 of FIG. 14.

Figure 1:
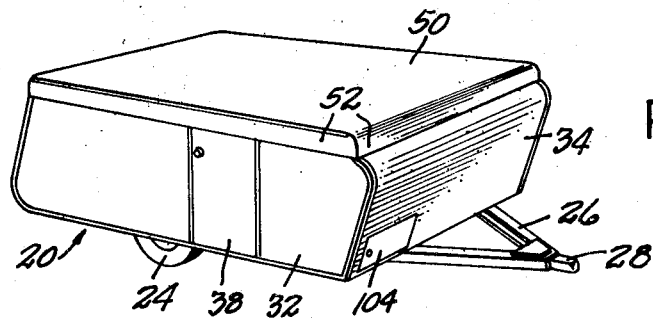
FIG. 1 is a perspective view of my new trailer in collapsed condition.

Referring to the drawings which illustrate the preferred embodiment of the invention, the numeral 20 designates the body of the trailer which is provided with a suitable rigid frame 22, supporting wheels 24 with suitable spring suspension (not shown) and a forwardly projecting tongue 26 mounting a suitable coupler 28 for detachable connection with a king pin carried by a tractive vehicle (not shown). The tongue also preferably includes a jack (not shown) by means of which the trailer body can be supported in horizontal position in conjunction with the supporting wheels 24 when disconnected from a tractive vehicle. The body includes a floor 30 supported upon the frame 22, side walls 32, front wall 34 and rear wall 36. One of the side walls 32 may be provided with a door 38. Each of the side, front and rear walls preferably includes an outer panel 40, an inner panel 42, intervening frame members 44, such as studs, and a top member 46.

Figure 2:
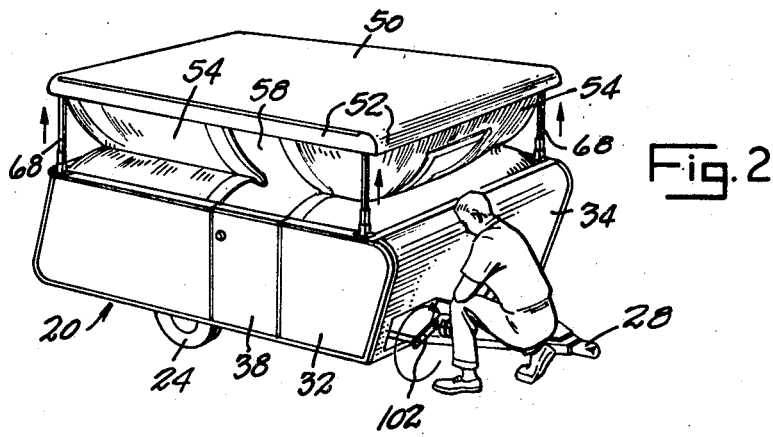
FIG. 2 is a perspective view of my new trailer in partially erected or extended condition.
Figure 3:
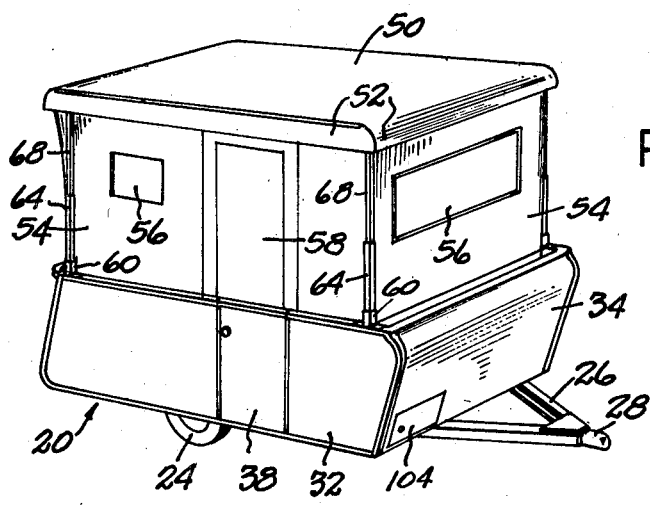
FIG. 3 is a perspective view of my new trailer in erected or extended position.

A rigid trailer top 50 has depending side, front and rear flanges 52. The lower margins of the flanges 52 are preferably dimensioned to fit around the top margins of the walls of the body 20, as best seen in FIGS. 1 and 6. Collapsible wall forming panels 54, which may be formed of fabric or any other suitable material, are connected at their lower margins to the top margin of the walls of the body 20 and at their upper margins to the lower margins of the top flanges 52 as illustrated in FIG. 2. The panels 54 may include suitable windows 56 and may carry a closure 58 cooperating with the door 30 to afford access to the interior of the vehicle.

At or near each of the four corners of the body 20 is mounted fixedly the rigid outer tubular member 60 of a multiple part vertical telescoping post. Outer tube members 60 are preferably mounted fixedly within the trailer body, preferably between the inner and outer panels 40, 42 of the walls thereof. The lower ends of tubes 60 are spaced above the level of the floor 30 and the upper ends thereof extend through openings in the top frame members 46 of the body. Each outer tubular member 60 is preferably of continuous but non-circular cross sectional configuration, such as a metal tube of uniform dimension and of square cross sectional shape. Within the upper end of each outer tubular member 60 is positioned and secured a member 62 which defines a stop or shoulder and also a slidable guide for an intermediate rigid non-circular tubular member 64. The lower end of member 64 carries a member 66 externally thereof which constitutes a guide and cooperates with the member 62 to both guide and limit the travel of the intermediate member 64 relative to the outer tubular member 60. The stop members 62 and 66 may either encircle the intermediate member 64 or may be positioned at one or more of the sides thereof as desired. An elongated rigid non-circular inner member 68 has a snug sliding fit in the intermediate tubular member 64 and carries an external abutment and guide member 70 at its lower end engagable with a stop or guide 72 mounted within the upper part of the intermediate tube member 64. The inner member 68 is preferably a metal tube, but may be a bar or a rod having a snug sliding fit in the intermediate member 64, the movement thereof relative to the member 64 being guided in part by the parts 70 and 72 and limited upon contact of the members 70 and 72, as illustrated in FIG. 12.

At its upper end, each inner member 68 is secured to a flange portion 52 of the top structure, as by a bracket or connector 74, as illustrated in FIGS. 6, 7, 10 and 12. The telescoping post parts 60, 64, 68 have minimum sliding clearance to accommodate relative endwise movement thereof and to insure that, upon extension thereof as illustrated in FIG. 12, each assembly will constitute a rigid post located adjacent a corner of the trailer and serving to support the top structure 50 firmly in desired elevated position.

A plurality of curved tracks 76 are fixedly secured in the trailer body 20, each with its upper end aligned with the lower end of an outer tubular member 60 and its lower end bearing upon the floor or panel 30 and preferably extending transversely of the trailer body. Each track 76 is preferably of channel shape in cross section, having a web 78 and a pair of side flanges 80 projecting from the concave face of the web. In the preferred form, the concave face of the track 76 is lined with a plastic material 82, such as Teflon or nylon, which has at least some measure of inherent lubricity or antifriction properties for purposes to be described.

A guide tube 84 is aligned with the lower inner end of each curved track 76 and is fixed secured to the floor or panel 30 of the body. The guide tubes 84 preferably extend transversely of the trailer with their inner end portions preferably positioned side by side as seen in FIG. 4.

An elongated flexible substantially incompressible post elevating member, such as a tight wound coil spring 86, extends through each guide tube 84, cooperating track 76 and into the cooperating telescoping post. The outer diameter of the coil spring 86 is preferably only slightly less than the spacing of the inner faces of opposite walls of the intermediate tube 64, as illustrated in FIG. 15. The upper end of member 86 is anchored to the lower end of the elongated inner post member 68 in any suitable manner. Thus, as illustrated in FIG. 14, where the inner post member 68 is a tube, a plug member 88 is fixedly secured within member 68 at the lower end thereof and is provided with a downwardly projecting reduced diameter stud 90 which is encircled by the upper end of the coil spring 86 and to which the upper end of the coil spring 86 may be fixedly secured in any suitable manner. The member 86 emerges from the lower end of the outer tube 60 and enters and passes through and is guided by the curved track 76 and thence enters the aligned outer end of the adjacent cooperating transverse tube 84 within which it has slight sliding clearance as illustrated in FIG. 8. The free end of the horizontal section of member 86 within the transverse tube 84 abuts and is preferably connected to a block 92 slidable within the tube 84. The innermost position of block 92 in tube 84 is preferably determined by a stop 94 carried by tube 84 as seen in FIG. 9.

Means are provided for simultaneously and equally shifting each of the flexible elevating members 86 endwise and upwardly relative to a cooperating telescoping post structure. Such means preferably include a winch 100, as illustrated in FIGS. 2 and 4, adapted to be operated by a releasable operating crank 102. The winch 100 is preferably mounted within the body 20 adjacent one end thereof and is accessible upon removal of a releasable closure plate 104. The winch 100 may be of any suitable construction and preferably will be provided with a lock or latch (not shown) for releasably maintaining a selected position. Winch 100 has secured thereto and wound thereon one end of an operating cable 106 which preferably extends transversely of the trailer body. Adjacent one end thereof the cable 106 extends through an opening in the central portion of an equalizer or connector plate 108. The free end of the cable 106 is connected in any suitable manner to plate 108, as by means of a collar 110 crimped on the end of the cable 106 and bearing against the plate 108 around a central opening through which the cable 106 passes.

Four actuator cables 112, 114, 116 and 118 are secured to the connector or equalizer plate 108 in equi-spaced relation to cable 106 and preferably at the corners of the plate. Cable 112 extends to and around a pulley 120 journaled in a bracket carried by the outermost end of the transverse tube 84 cooperating with the curved track 76 and the telescoping post positioned at the front righthand corner of the vehicle as viewed in FIG. 4. Cable 112 extends into and longitudinally through the tube 84 which carries the pulley 120 and alongside member 86 therein as illustrated in FIG. 8. The free or inner end of the cable 112 is passed through an opening in the block 92 within said tube 84 and is anchored thereto as illustrated in FIG. 9. Cable 114 is trained around a pulley 122 journaled in a bracket carried by the vehicle floor 30 adjacent to the pulley bracket 120. From the pulley 122, the cable 114 extends transversely across the vehicle to a pulley 124 carried by the outermost end of the guide tube 84 correlated with the telescoping post at the left front corner of the vehicle as viewed in FIG. 4. Cable 114 passes into the tube 84 carrying pulley 124 and is anchored to the block 92 at the inner end thereof.

Each of the cables 116 and 118 is trained around a pulley journaled in a bracket 125 secured within the trailer body adjacent the floor at one side thereof. The cables 116 and 118 extend from pulley bracket 125 longitudinally of the trailer body to pulleys journaled at the rear of the trailer body in a pulley bracket 126. The free end portion of cable 116 enters and passes lengthwise through the tube 84 at the rear of the vehicle which cooperates with the curved track 76 and the telescoping post structure at the rear righthand corner of the vehicle as viewed in FIG. 4, and is connected to the block 92 in that tube 84. Cable 118 extends from the pulley bracket 126 transversely across the body of the trailer to and around a pulley 128 carried by the outer end of the transverse tube 84 which cooperates with the curved track 76 and the telescopic post at the left rear corner of the vehicle as illustrated in FIG. 4, and is connected to the block 92 in that tube 84.

The top 50 is lowered to rest upon the body 20 during travel and any suitable releasable latch means (not shown) may be employed to hold the top firmly upon the body. When it is desired to extend the structure by elevating the collapsible walls 54, the operator first removes the closure plate 104 which normally conceals the winch. The operator then applies the operating crank 102 to the winch as illustrated in FIG. 2 and rotates the crank 102 in a manner to pull upon the operating cable 106 and thereby to urge endwise each of the actuator cables 112, 114, 116 and 118.

Operation of the winch to erect the structure pulls the operating cable 106 to the left as viewed in FIG. 4, thereby pulling the equalizer or connector plate 108 also to the left, as seen in FIG. 4, and pulling endwise upon each of the cables 112, 114, 116 and 118 which are connected to the connector plate 108. By reason of the arrangement of the cables 112, 114, 116 and 118, as described above, endwise pull thereon by the connector plate 108 serves to pull the opposite end of each cable in a direction outwardly of the transverse tube 84 in which it is reecived and toward the curved track 76 cooperating with that tube. This action entails a pull upon the sliding block 92 in each tube 84 in a direction to push against the end of the coil spring or member 86 by the block 92 which serves to push upwardly the lower end of each elongated inner member 68 of each telescoping post, as by pushing upwardly against the plug 88 secured in the lower end of each tubular inner telescopic support member 68 as seen in FIG. 14. The endwise movement of the coil springs or members 86 is guided by the respective guide tubes 84, curved guide tracks 76 and the telescoping tube parts 60 and 64 of the respective telescoping posts. The coil springs or members 86 have slight clearance in these parts 84, 76, 60 and 64 so that lateral deflection of the coil spring or member 86 incident to upward endwise pushing movement thereof is held at a minimum.

The initial endwise movement of the coil springs or members 86 acts to elevate the inner members 68 of the telescoping posts relative to the intermediate telescoping tube 64 until the stops or abutment members 70 and 72, as seen in FIG. 14, abut. Thereafter continued endwise upward movement of the coil springs or members 86 will cause elevation of the members 64 and 68 of the telescoping posts together and relative to the outer telescoping member 60. This action continues until the abutment members 62 and 66 of FIG. 15 engage, at which point the maximum extension or elevation of the posts has occurred. When this action occurs, the latching mechanism of the winch is set or locked and the telescoping posts at the four corners of the vehicle are held in their extended position to support the top 50 at a useful elevation and to extend to operative position the foldable or collapsible walls 54 of the structure.

When it is desired to collapse the trailer, the latching mechanism of the winch is released and the winch crank is turned in proper direction to permit payout of the operating cable 106 from the winch. The weight of the top and associated parts is sufficient to cause endwise downward movement of the coil springs or members 86 at a rate controlled by the rate of lowering operation of the winch crank for the purpose of lowering the top and restoring the top and the vehicle to collapsed travel position as illustrated in FIG. 1.

It will be observed that the winch and all cables and operating parts of the device are located within the trailer body and in such position they are effectively protected against road dirt, mud, slush and corrosive road covering material, such as road salt used in snowy and icy weather. Thus the device is effectively protected against failure and against obstruction to free operation thereof.

It will be observed that the only interruption of the trailer body which could reduce the strength thereof occurs at the openings below each of the tubes 60 through which the curved tracks pass. Thus, if reinforcement is required at these points, slight strengthening of the structure will provide adequate compensation for the interruptions without sacrifice of access to the operating parts, such as the track 76.

Another important consideration of the device is that the cables and their guide tubes 84 and tracks 76 and pulleys are located adjacent the floor and to the trailer walls, so that they present minimum interference to the positioning and functioning of fixtures, furniture and accessories within the trailer, and yet they are readily accessible in the event of need for repair or replacement of parts.

Another important characteristic of the device is the fact that it permits the use of telescoping tubes 60 and 64 which are of continuous cross section, as distinguished from requiring the use of telescoping parts of C-shaped or channel cross section which are required in my prior device.

The use of a coil spring as a pusher member is also important with respect to the simplicity and strength and flexibility required for the top elevating function.

I claim:

1. A collapsible vehicle comprising a wheeled body, a top shiftable between a collapsed position on said body and an elevated position above said body, a telescopic post carried by said body adjacent each corner thereof and connected to said top and having inner and outer telescopic parts, a curved guide carried by said body below each telescopic post, a substantially horizontal guide tube cooperating with each curved guide and carried by said body, an elongated flexible substantially incompressible member within and guided for endwise movement in each cooperating set of guide tube, curved guide and telescopic post and connected to the lower end of the inner part of the telescopic post, means carried by the parts of each telescopic post for limiting the endwise extension of said post, and means for shifting said flexible incompressible members endwise in said guide tubes and said curved guides and within said telescopic posts to extend said posts and elevate said top.

2. A collapsible vehicle as defined in claim 1, wherein said flexible incompressible members constitute tight wound coil springs.

3. A collapsible vehicle as defined in claim 1, wherein said last named means includes a cable extending lengthwise in each guide tube and connected to the end of said incompressible member remote from the cooperating telescoping post.

4. A collapsible vehicle as defined in claim 1, wherein said incompressible members constitute tight wound coil springs, said guide tubes are non-circular in cross section to provide a clearance passage therein alongside said incompressible member, an abutment member is slidable in each guide tube and engages an end of said incompressible member, and said last named means includes an elongated member connected to each abutment member and extending through the clearance passage in the guide tube.

5. A collapsible vehicle as defined in claim 1, wherein said last named means includes a winch with releasable latch means, and a plurality of cables connected for simultaneous equal endwise movement by said winch, each cable terminating in a portion extending through a guide tube and connected to the end of the incompressible member therein.

6. A collapsible vehicle as defined in claim 1, wherein each telescopic post includes outer and intermediate tubes of continuous cross section.

7. A collapsible vehicle as defined in claim 1, wherein said body has a floor and vertical walls, each telescoping post being carried by and extending vertically on a wall and terminating spaced above said floor, each curved guide and guide tube being secured to said floor, the upper end of each curved guide being aligned with the lower end of a telescoping post.

8. A collapsible vehicle as defined in claim 1, wherein said curved guide constitutes a member of channel shape in cross section open at its concave portion.

9. A collapsible vehicle as defined in claim 1, wherein said curved guide has a longitudinally concave track with side flanges and is lined with a plastic material.

10. A collapsible vehicle as defined in claim 1, wherein said posts, curved guides, guide tubes, incompressible members and means for shifting said incompressible members are confined within the vehicle when collapsed.

References Cited
UNITED STATES PATENTS
3,273,934   9/1966   Hagenson _____ 296—26

PHILIP GOODMAN, Primary Examiner

U.S Cl. X.R.
52—66